United States Patent

[11] 3,594,898

| [72] | Inventor | Raymond F. Lewandowski<br>Mount Prospect, Ill. |
|---|---|---|
| [21] | Appl. No. | 851,767 |
| [22] | Filed | Apr. 12, 1968 |
| [45] | Patented | July 27, 1971 |
| [73] | Assignee | Oak Electro/Netics Corporation<br>Division of Ser. No. 634,399, Mar. 23, 1967, Pat. No. 3,389,235, and a continuation-in-part of 474,244, July 23, 1965. |

[54] METHOD OF MAKING A ROTARY SWITCH
3 Claims, 11 Drawing Figs.

[52] U.S. Cl. ........................................... 29/622,
29/416, 29/418, 29/434, 29/630 C, 200/11
[51] Int. Cl. ............................................. H01b 11/00
[50] Field of Search ..................................... 200/11, 11
D; 29/622, 630 B, 630 C, 630 G, 418, 509, 413,
416, 434; 339/5, 8

[56] References Cited
UNITED STATES PATENTS

| 2,724,867 | 11/1955 | Smith | 29/418 X |
| 3,013,231 | 12/1961 | Meadows et al. | 200/11 UX |
| 3,129,495 | 4/1964 | Kohlhagen | 29/596 |
| 3,177,306 | 4/1965 | Mastney | 200/11 |
| 3,214,826 | 11/1965 | Valdettaro et al. | 29/622 |
| 3,248,488 | 4/1966 | Stephan | 200/11 |

Primary Examiner—John F. Campbell
Assistant Examiner—Carl E. Hall
Attorneys—Howard T. Markey, Alfred H. Plyer, Jr., James G. Staples and Daniel C. McEachran ABSTRACT: A rotary selector switch of molded plastic having a rotor blade overlapping the edge of the stator, with an axially directed rim on the stator around the rotor opening. The face of the stator is divided into sections for the stator clips, by radial ribs. The switch is assembled from a molded blank having a stator portion with a rotor portion attached thereto by an integral web. The rotor portion is parallel to and axially spaced from the stator, in line with the rotor opening. A rotor blade is placed on one side of the rotor with an attachment leg extending into the rotor. An axial force is applied to the rotor, rupturing the web, moving the rotor into the opening of the stator and securing the rotor blade to the rotor.

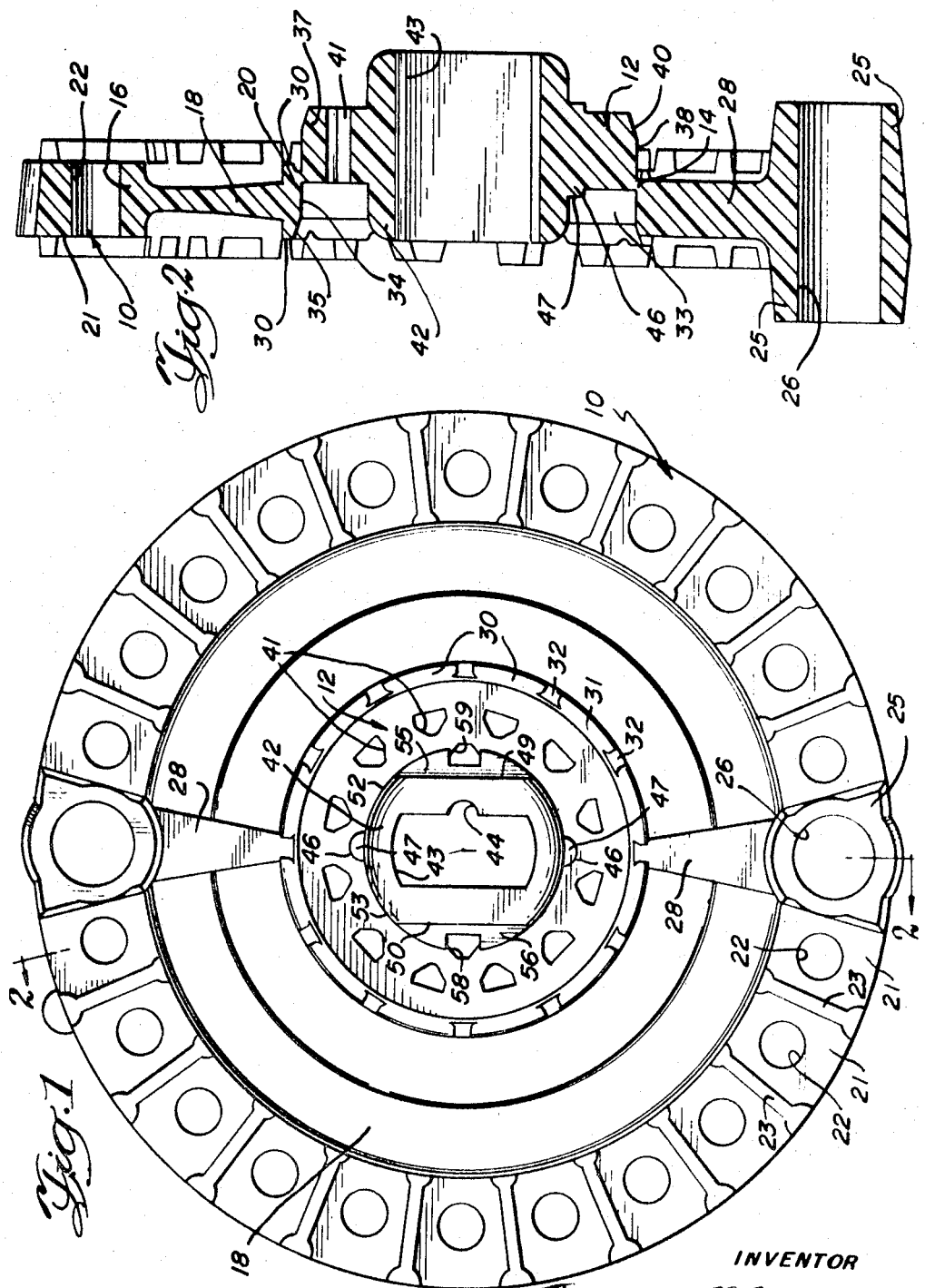

SHEET 3 OF 3
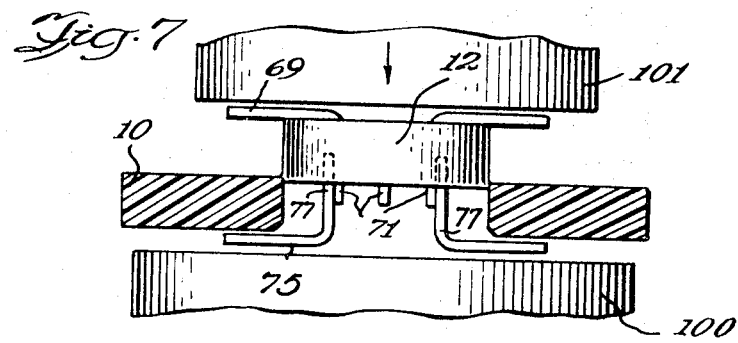
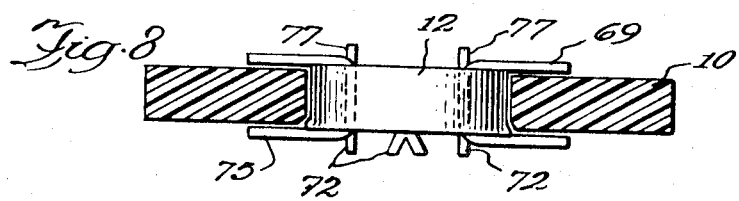
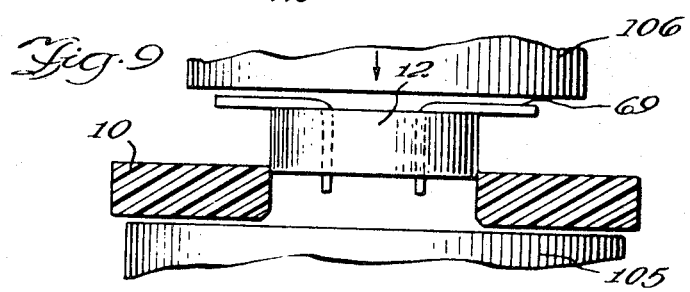
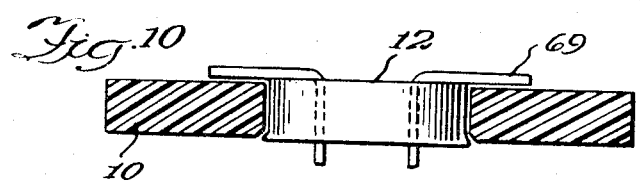
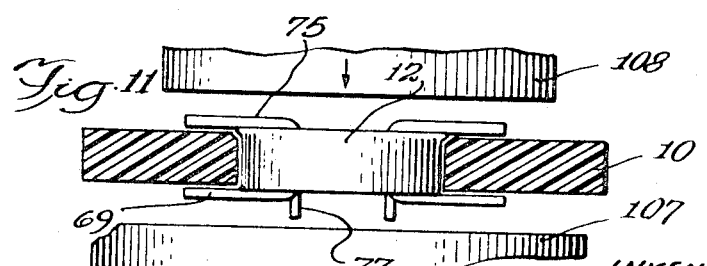
INVENTOR
Raymond J. Lewandowski
BY Hofgren, Wegner, Allen, Stellman & McCord
ATTORNEYS 3,594,898

METHOD OF MAKING A ROTARY SWITCH

This application is a division of Lewandowski application Ser. No. 634,399 filed Mar. 23, 1967, now U.S. Pat. No. 3,389,235 which is a continuation-in-part of Lewandowski application Ser. No. 474,244, filed July 23, 1965.

This invention relates to a switch and more particularly to a multiposition rotary switch, to a method of making parts of such a switch and to a method of assembling a multiposition switch.

It is an object of this invention to provide an improved electric switch having molded parts.

It is another object of this invention to provide an improved method for molding a rotor and a stator for a switch in one piece.

A further object of this invention is to provide an improved method for separating a rotor from a stator and an improved method for assembling a switch.

Another object of this invention is to provide an improved switch having coacting parts to maximize efficiency of assembly while improving the electrical characteristics of the switch.

Still another object of this invention is to provide an improved electric switch having locating means on the stator which serve to increase the length of the electric leakage paths to adjacent metal components.

And still another object of this invention is to provide an improved stator construction whereby a larger number of contact clips can be mounted on said stator.

Still another object of this invention is to provide an improved electric switch wherein the stator has raised means around the rotor opening to provide a bearing surface for the rotor blades and means are provided on said raised means for preventing electrical conduction between nonconnected circuits.

Another object of this invention is to provide an improved electric switch wherein the rotor has an enlarged hub surrounding the mounting aperture which will increase the electric leakage path from the metal shaft to the rotor blades.

And yet another object of this invention is to provide an improved electric switch whereby the rotor blade contacts can be mounted directly on the rotor or can be mounted on a separate insulator which can be mounted on the rotor permitting greater segmentation of the rotor blade contacts and increases the versatility of the switch.

Another object of this invention is to provide an improved method of assembling a switch section whereby the rotor and stator are molded together to create an orientation that permits proper assembly of parts on said rotor and stator without separate orientation procedures therebetween.

Other objects and advantages will become readily apparent from the following description taken in connection with the accompanying drawings, in which:

FIG. 1 is a plan view of my improved one-piece molded stator and rotor construction;

FIG. 2 is a cross-sectional view taken along the line 2-2 of FIG. 1;

FIGS. 7 and 8 are simplified sectional drawings illustrating a preferred method of assembly of a switch; and FIGS. 9 through 11 are simplified sectional drawings illustrating another method of assembly.

Figure 3:
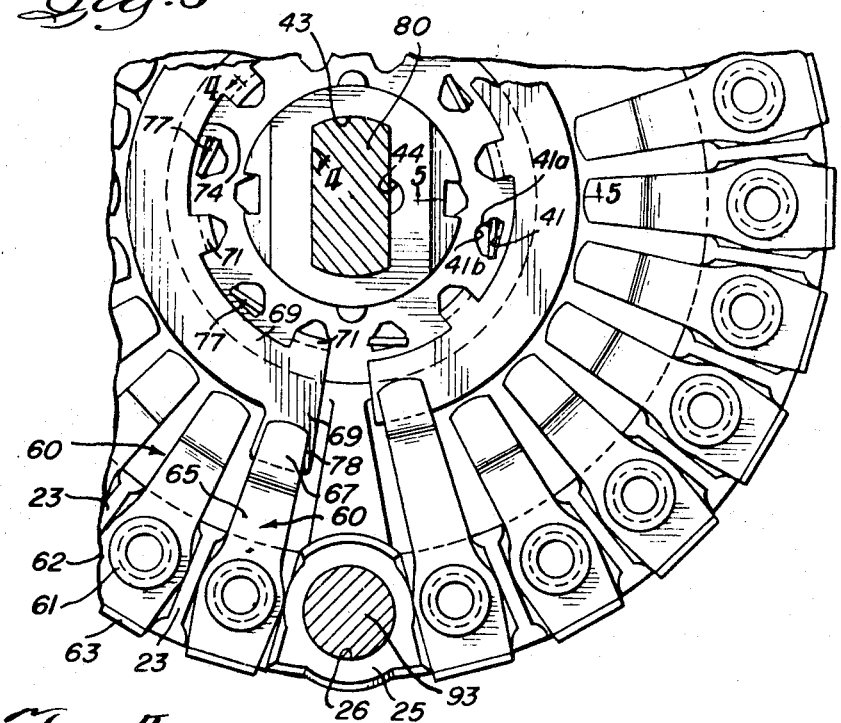
FIG. 3 is a fragmentary view of my improved switch in assembled condition.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Heretofore, most switches of the multiposition type have had the body portions formed of pressed phenolic resin material, of molded and fired steatite ceramic material or like insulating materials. The manufacture of these body portions requires either stampings, impregnating, pressing, firing or some such costly and/or time-consuming process. With the individually made body portions there has always been the problem of properly matching up the rotor portions to the apertures in the stator portions so that some reasonable degree of concentricity resulted without interference between the parts.

By molding the rotor and stator in one piece with the plane of the rotor being displaced axially from the plane of the stator and with the two joined only by a thin web, the rotor and stator are sure to match up and the assembly of a switch is immediately ready to proceed after the one-piece rotor and stator is removed from the die. Specifically, a stator 10 lying in one plane is joined to a rotor 12 lying in another plane displaced axially from said one plane by a thin continuous web 14. The material used in the molding of the rotor and stator can be any of the insulating plastics and the molding can be accomplished by injection molding or by any other appropriate technique.

The stator 10 is composed principally of three concentric but integrally joined parts, namely, an outer mounting part 16, a flange part 18 and an axially directed backing rim part 20. The mounting part 16 is divided into an appropriate number of clip-mounting sections 21, each having an opening 22 passing therethrough and each having a pair of radially disposed axially projecting ribs or partitions 23 defining the side edges of said sections 21. Disposed on the same circumferential circle as the centers of the openings 22 is a pair of bosses 25 having mounting or strut holes 26 passing therethrough. The bosses project some axial distance beyond the planes of the ribs or partitions 23 and serve as minimum length spacers between adjacent switches when two or more individual switches are assembled in a multiple section switch.

Formed integrally with the outer mounting part 16 is the flange 18 which extends radially inwardly toward the axially directed rim part 20. A thickened portion 28 of the flange 18 extends from the respective mounting bosses 25 to the axially directed rim part 20 to add rigidity to the whole stator structure. Formed integrally with and projecting in opposite axial directions is the raised rim 20 which has end faces or edges 30 lying substantially in the same plane as the plane containing the end faces of the clip-mounting sections 21. As can be best seen in FIG. 1, the faces or edges 30 are broken up into a plurality of substantially equal length arcuate segments by radially disposed grooves 32. The axially disposed rim 20 defines an aperture 33 having a wall 34 with an outwardly tapered portion 35. The aperture 33 in the stator is adapted to receive the rotor 12 in freely rotatable relationship.

The rotor 12 as shown in FIGS. 1 and 2 is molded as one piece with the stator 10 and prior to assembly as a switch is joined thereto by a thin breakable continuous web 14. The annular body or base 37 of the rotor has an outer wall 38 with an inwardly tapered peripheral portion 40. A plurality of equally spaced-apart openings 41 pass through the base 37 of the rotor with the centers of each opening lying on a common circumference of a circle centered at the center of the rotor. Each opening 41 has a relatively large portion 41a and tapers toward the center of the rotor to a rounded apex at 41b. The taper of the openings has a tendency to wedge or urge an element placed in the opening radially outwardly, as will appear hereinafter. Extending axially in opposite directions from the base or body 37 is a hub 42 which has a shaft hole 43 passing therethrough. The hub has a cutout notch 44 which may coact with a key on a shaft to properly orient the shaft relative to the rotor. A pair of lugs 46 are formed integrally with the base and hub on opposite sides thereof to provide an abutting surface or shoulder 47 for a purpose to be described hereinafter. Two opposite surfaces 49, 50 of the hub 42 are flattened and extend to portions 52, 53 forming shoulders 55, 56 lying in the same plane as the shoulders 47, 47. A pair of apertures 58, 59 pass through the base 37 and the portions 52, 53 and communicate with the shoulders 55, 56.

At the appropriate time during an assembly operation a light axial blow is administered to the rotor 12 toward the plane of the stator which blow ruptures the flash or web 14 and permits the rotor to drop into alignment within the aperture 33 in the stator. The flash lines or broken edges of the web 14 are partly retained on the rotor and partly on the stator, however, the tapered portion 35 in the wall of the stator will receive in noninterfering relationship the flash lines on the rotor while the tapered portion 40 on the wall 38 of the rotor will receive in noninterfering relationship the flash lines on the stator. With the just described construction, the rotor can turn freely within the aperture in the stator without interference from the flash lines.

A plurality of stationary contact clips 60 are fastened to the outer mounting part 16 of the stator 10 in any one of the well-known manners. Specifically, an eyelet 61 passes through the anchor portion 62 of the clip 60, through the aperture 22 and is either then fastened to the stator or passes through another clip 60 on the other side of the stator. In the event two clips are fastened to the same eyelet means are provided for insulating one clip from the other. Attaching ears 63 extend from the anchor portion 62 of each clip 60 for connection to an appropriate electric connector of a circuit. The anchor portions 62 of the clips fit between the ribs 23 which ribs serve to position the clip 60 for securing on the stator 10 as well as seating the clip in a fixed position relative to the stator and for preventing the clip from turning relative thereto. The forward extending parts of each clip 60 are shaped in such a way that the resiliency of the opposite halves 64, 65 of the clips 60 urge the contact points 66, 67 toward each other. The points 66, 67 are shaped in such a way that they will guide a contact plate or rotor blade 69 therebetween during operation of the switch. As will be obvious in examining FIG. 3 of the drawings, some clips are longer than others and are accordingly adapted to make contact with different parts of the contact plate or rotor blades 69 as the need demands.

Figure 4:
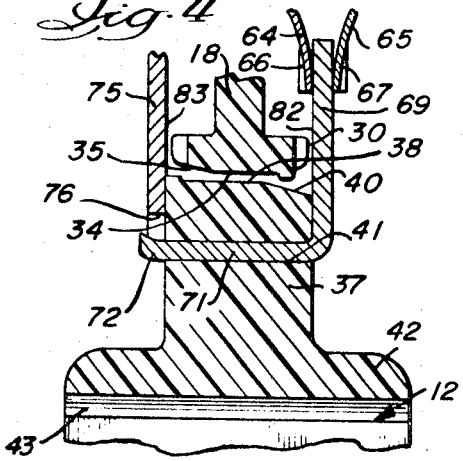
FIG. 4 is an enlarged cross-sectional view taken along the line 4-4 of FIG. 3.

The rotor 12 as shown in FIGS. 3 and 4 has one or more rotor blades 69 projecting radially outwardly from the base 37 of the rotor in overhanging or overlapping relationship relative to the rim or edge 30 of the stator. Each rotor blade 69 is attached to the base 37 by means of the tabs 71 extending inwardly from the edge of the blade at right angles to the tabs and through the openings 41 in the base. The outer end 72 of the tab 71 is twisted or turned over a slight amount sufficient to hold the blade 69 securely against the face of the rotor. Each blade 69 has several tabs 71 extending through several openings 41 for holding the blade to the rotor. On the blade 69 and between each pair of tabs 71 there is a cutout 74 which bridges around the intermediate openings 41 in the rotor. One or more additional blades 75 can be mounted on the opposite face of the rotor by means of tabs 77 in the same manner as tabs 71. Each blade 75 will have cutouts 76 for bridging the attaching ends 72 of the tabs 71 on the other blades 69 so that no contact will be made between blades on opposite sides of the rotor unless it is specifically wanted. The various blades 69, 75, etc. can be substantially full circles, small segments of circles or various combinations in-between. Sometimes two or more segments of blades 69, 75, etc. will go to make up the contacts on each side of the rotor. The blades 69, 75, etc. have several different radially extending steps such as step 78 which is contacted only by certain shorter clips 60 on the stator.

With the rotor 12 having the blades 69, 75 overlapping with the axially disposed rim 20 of the stator 10 into contact with one or more appropriately positioned clips 60, current would be permitted to flow from one clip 60 to another through the appropriate contacts with the blade 69. As a shaft 80 passing through the odd-shaped opening 43 in the rotor is turned, the blades 69, 75, etc., engage, disengage or remain in contact with one or more pairs of contact points 66, 67 on the clips 60.

In assembling a switch, a one-piece molded rotor and stator is held in a jig or the like while the clips 65 and rivets 61 are secured in the openings 22 in the stator. The lengths of the clips 65 are determined by a preconceived design specification. A rotor contact blade 69 has its mounting tabs 71 threaded through the openings 41 in the rotor 18 from the side of the rotor most removed from the stator. The ends of the tabs 71 can be twisted to hold the blade 69 on the rotor. At this point the rotor and blade 69 can be rapped toward the stator to rupture the web 14 for dropping the rotor into position within the stator opening. A blade 75 is now assembled with the other side of the rotor by threading the tabs 77 through openings 41 and by turning the ends of the tabs 77 into looking position.

As an alternative after the blade 69 is assembled to the rotor and before the web 14 is ruptured, the blade 75 can be positioned in overlapping relation with the stator and with the forward ends of the tabs 77 threaded part way into the openings 41 whereupon rapping the rotor toward the stator ruptures the web 14 and drives the tabs 77 the rest of the way through the openings 41. The ends of the tabs 77 can be bent or twisted to complete the assembly of the rotor blades, rotor, stator and contacts of the switch.

The molded switch construction is particularly suited for an assembly process having a minimum of manual operation. In FIGS. 7 and 8, a preferred assembly operation is illustrated. Upper and lower rotor blades 69 and 75 are mounted on the molding with legs 71 and 77 extending into the holes in the rotor 12. Legs 71 extend all the way through the rotor while legs 77 extend only part way through, as blade 75 engages the undersurface of stator 10. The partially assembled switch section is placed on an anvil 100 and struck with a hammer 101 which serves to break rotor 12 free and push it downwardly into the plane of stator 10. The downwardly projecting legs 71 of rotor blade 69 are staked by engagement with anvil 100. At the same time, downward movement of rotor 12 causes legs 77 of rotor blade 75 to project outwardly through the rotor where they are staked by the downwardly moving hammer 101. This single operation completes the assembly of the rotor and stator and of the rotor blades. The partially assembled switch section then has the stator clips (not shown) attached thereto.

The two rotor blades may be separately affixed to the rotor if desired, FIGS. 9 to 11. This two-step operation has been found useful where the tools available do not include a hammer which can serve as a backup member to stake the ends of the legs 77 of lower rotor blade 75. Upper rotor blade 69 is mounted on the rotor portion 12 of the combined molding, and the assembly is placed on anvil 105. Hammer 106 strikes the upper surface of rotor blade 69 breaking rotor 12 free from stator 11, forcing the rotor downwardly and staking the ends 72 of the rotor blade. The subassembly is inverted and rotor blade 75 added, with legs 77 extending through the rotor. This assembly is placed on anvil 107 and struck by hammer 108, staking the legs 77. Appropriate stator contacts are then secured to the switch (not shown).

It is possible that contact blades 69, 75 will be needed on only one side of the switch. In that case a dummy blade or insulator can be substituted on the side of the rotor not needing an electrical contact member. The dummy is attached or assembled to the rotor in the same manner as the regular contact would be assembled and would serve to hold the rotor assembled on the stator from the dummy side of the switch so that the rotor will not fall out of the stator opening.

The inner surfaces 82, 83, respectively, of the blades 69, 75 are occasionally urged into sliding contact with the faces 30 of the radial rim 20 as the rotor is turned relative to the stator. The rim 20 serves as a backing member for the blades during such turning. After the switch has been used for a period of time, the metal of the surfaces 82, 83 of the blades 69, 75 will rub off onto the faces 30 of the rim, which metal can build up enough to conduct current from one blade to another. So as to prevent this conduction of current, the rim 30 is divided into segments 31 by means of the radial grooves 32 cut into said rim. The grooves 32 prevent the metal from building up into a continuous circuit so as to eliminate the transmission of unwanted current from one blade to another.

Even though the material used to make the rotor and stator has low dielectric and high insulating characteristics, small amounts of current leak from the contacts along the surface of the material of the stator and rotor. So as to assist in dissipating current from the contacts by increasing the surface distance between metal components, the ribs 23 adjacent the anchor portion 62 of the clips 60 have been stator up and have been found to increase the leakage path from one clip to the adjacent metal components, such as eyelets, dummy lugs and other clips. The long spacer bosses 25 on the stator and the long hub 42 on the rotor serve also to increase the length of the leakage paths from clips and blades to the mounting hardware and the metal shaft and rotor blades, respectively, so as to minimize the amount of leakage current that flows over the surfaces of the rotor and stator to the adjacent metal parts. By so increasing the leakage paths the incidence of excessive arcing, static shocks and the like have been substantially eliminated or materially reduced in intensity.

Figure 5:
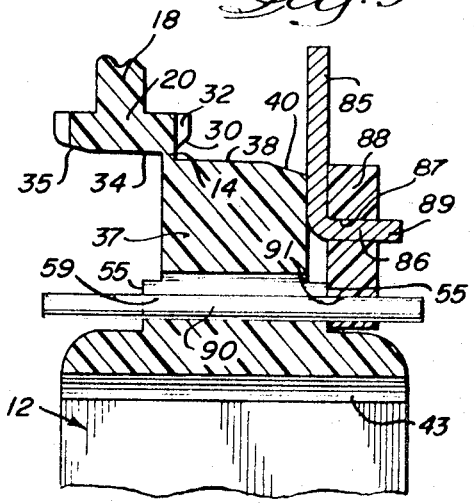
FIG. 5 is an enlarged cross-sectional view taken along the line 5-5 of FIG. 3 showing a modified form of my invention.

A modified form of the invention is shown in FIG. 5 and is directed to the structure of mounting the rotor blades to secondary insulators, which insulators are then attached to the rotor insulator so as to permit the rotor blades to be segmented into more pieces, thus providing greater circuit versatility.

Specifically, a rotor blade 85 has tabs 86 bent outwardly at right angles thereto and passing through openings 87 in an arcuate-shaped secondary insulator 88. The end 89 of the tab 86 is twisted or bent to secure the blade 85 to the insulator 88. At least two tabs 86 will be required to hold a rotor blade 85 to the insulator 88. The insulator 88 is then positioned against the shoulders 47, 47, 55 and/or 56 which will locate the blade 85 against the base 37 of the rotor with the contact portion extending outwardly into overlapping relation with the radial rim 20 of the stator. A peg or pin 90 is passed through an aperture 91 in the secondary insulator 88 and through one of the openings 58, 59 in the rotor. The end of the pin can be bent over against the secondary insulator to hold the blade to the rotor.

As shown in FIG. 5, the blade 85 and secondary insulator 88 on one side of the rotor can be assembled on the rotor 12 while the stator 10 is still attached thereto by the web 14. The assembly of the blades to the rotor while the rotor and stator are still molded together is important in that the orientation of the blades 85 relative to the clips 60 on the stator is essential. Since the rotor and stator are oriented during molding the assembly of the clips and blades on the parts before rupture of the joint between the two is important and effects a saving in time of assembly. The clips 60 can also be assembled to the stator while the two are still attached. At this paint the rotor is given a light blow toward the stator which will rupture the web 14 and drop the rotor into the opening in the stator with the flash lines of the web 14 on the rotor and stator clearing the other by aligning with the tapers 40 and 35, respectively, in the juxtaposed surfaces. The rotor and stator will be manipulated to engage the appropriate clips with the blade 85 whereupon another (one or more) blade and secondary insulator (not shown) can be assembled on the pins 90 and secured to the rotor in the same manner as blade 85. The switch of FIG. 5 will be operated in the same manner as the form of switch shown in FIGS. 1 to 4.

The rotor can have the blade 85 staked in place on one side of the rotor and the second insulator and/or blade (not shown) loosely assembled on the other side of the rotor while the rotor and stator are still joined by the web 14 as described above. The web can then be ruptured to drop to the rotor into position and to move the stakes 90 through the other insulators and blades whereupon they can be staked in position to complete the rotor assembly on the stator. A dummy side can be created for the switch by not assembling a blade on the insulator on one side of the rotor; in that way the insulator will hold the rotor assembled on the stator.

The modified switch of FIG. 5 may have one continuous ring of secondary insulating material attached to each side of the rotor bearing against the shoulders 47, 47, 55, 56, with several short segments of blades attached thereto in the manner shown. The secondary insulator can also be of different sized segments. By this construction using the secondary insulators, it is possible to segment the blade into many more pieces which logically provides many more circuit possibilities.

Figure 6:
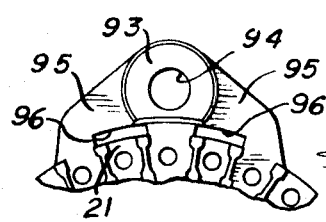
FIG. 6 is a fragmentary view of a modified form of mounting structure permitting more contact clip stations.

In FIG. 6 a modified form of mounting bosses 93 having strut holes 94 therethrough is shown. Bosses 25 of FIGS. 1 and 3 are molded within the circumferential circle surrounding the stator to provide a very compact switch assembly. If space is no problem or if more clip-mounting stations are needed, the bosses 93, as shown in FIG. 6, are molded externally of the ring of clip-mounting stations 21 on the switch. The bosses are joined to the stator by the webs 95 and are located far enough away from the center of the switch that several additional partitions 23 and clip-mounting sections 21 can be added to the stator. With this type of construction, the capacity of the switch is enlarged and its versatility is extended.

A pair of openings 96 are formed through the webs 95 in close proximity to the arcuate ends of the clip-mounting sections 21 of the stator. A clip 65 with the usual end tabs 63 mounted to section 21 can have the tab 63 pass through the opening 96 for exposure on the other side of the web 95. This often facilitates electrical connections to the tabs 63 without interference caused by the mounting bosses 93 extending outwardly in the way of the tabs on one particular side of the stator.

It can now be seen that the invention provides an improved switch section which can be assembled into multiple section rotary switches by passing rods through the openings 26 with the bosses 25 either serving as minimum length spacers between adjacent switches or with additional short spacers added between the bosses of adjacent switches to increase the spacing therebetween. A shaft 80 is passed through the opening 43 in the hub 42 of the rotors with a lug on the shaft aligning with and passing through the detents in the rotor openings. With the multiple section switch assembled, improved performance results from the positive positioning of the clips on the stator, from the raised rim backing for blades, and from the increased leakage paths of the ribs 23, hubs 42 and bosses 25. An improved method of making a switch results from the one-piece molded rotor and stator construction which assures properly sized rotors for every stator. The tapers of the parts are designed to prevent interference during operation, thereby eliminating the processing of the parts to remove the broken edges of the flash web. The one-piece rotor and stator is molded in such a way that all of the hardware on one side, and if desired, part of the hardware on the other side, can be assembled on the rotor and some or all of the hardware can be assembled on the stator before they are broken apart, thereby assuring exact mating of the rotor parts to the particular electrical stations on the stator.

I claim:

1. The method for making a rotary switch section from a molded blank having a stator portion with a rotor opening therein and a rotor portion attached thereto by an integral web, the rotor portion being axially spaced from the plane of the stator portion and in alignment with the rotor opening in the stator portion, which comprises placing a rotor blade on one side of the rotor portion with an attachment leg extending into the rotor portion, applying an axial thrust to the rotor portion in the direction toward the stator portion, thereby rupturing the web and bringing the rotor and stator portions into the same planes, and thereby securing the rotor blade to the rotor portion.

2. The method for making a rotary switch section as set forth in claim 1, including the step of attaching stator clips to the stator portion after the rotor blade is secured to the rotor portion.

3. The method for making a rotary switch section as set forth in claim 1, including the steps of inverting the stator-rotor combination, placing a second rotor blade on the other side of the rotor portion, with an attachment leg extending into the rotor portion and applying an axial force to the blade, thereby securing it to the rotor portion.